No. 3,246.
REISSUED DEC. 29, 1868.
J. SHINN.
LOOM.
2 SHEETS—SHEET 1.
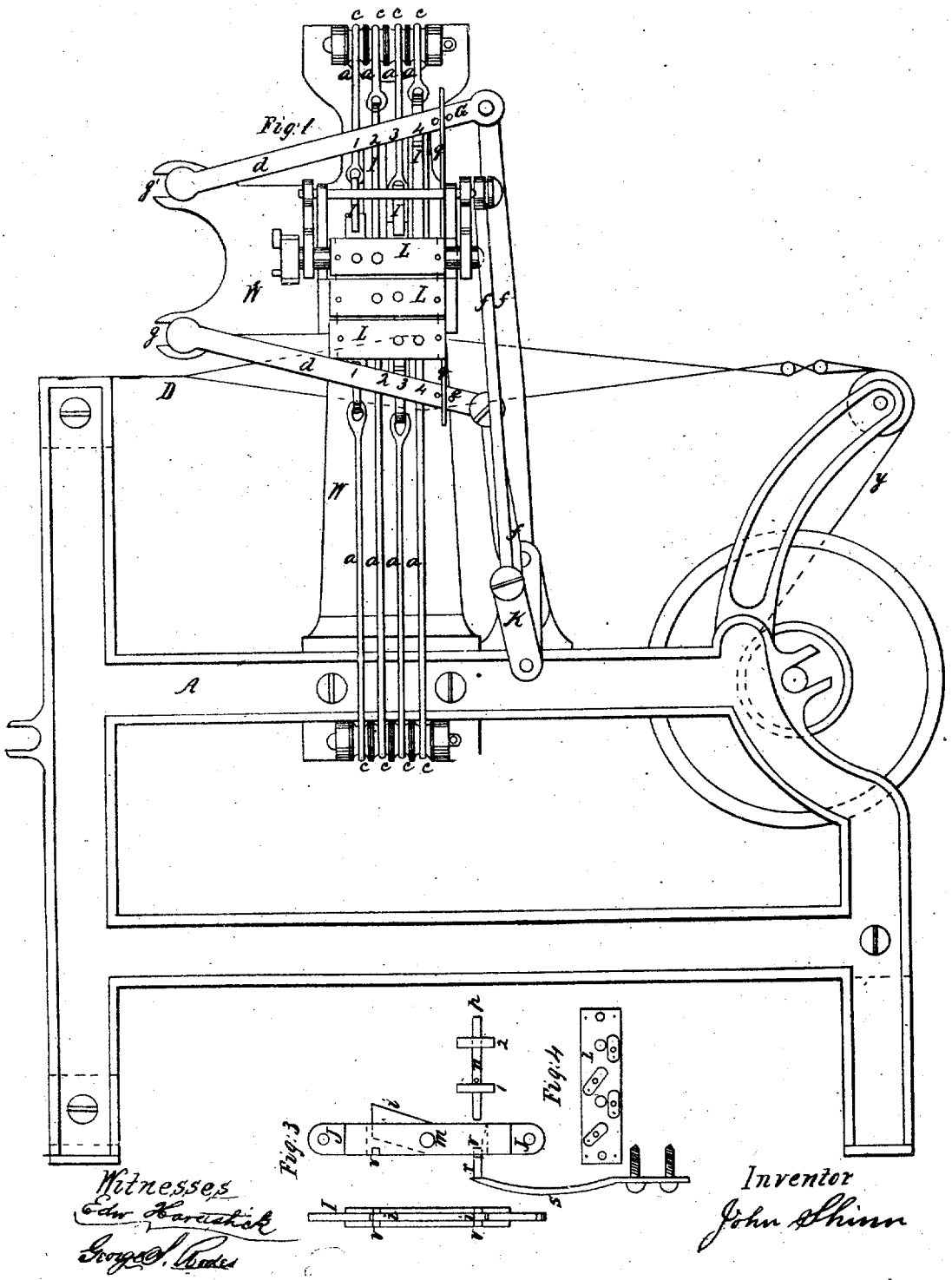

No. 3,246. REISSUED DEC. 29, 1868.
J. SHINN.
LOOM.
2 SHEETS—SHEET 2.
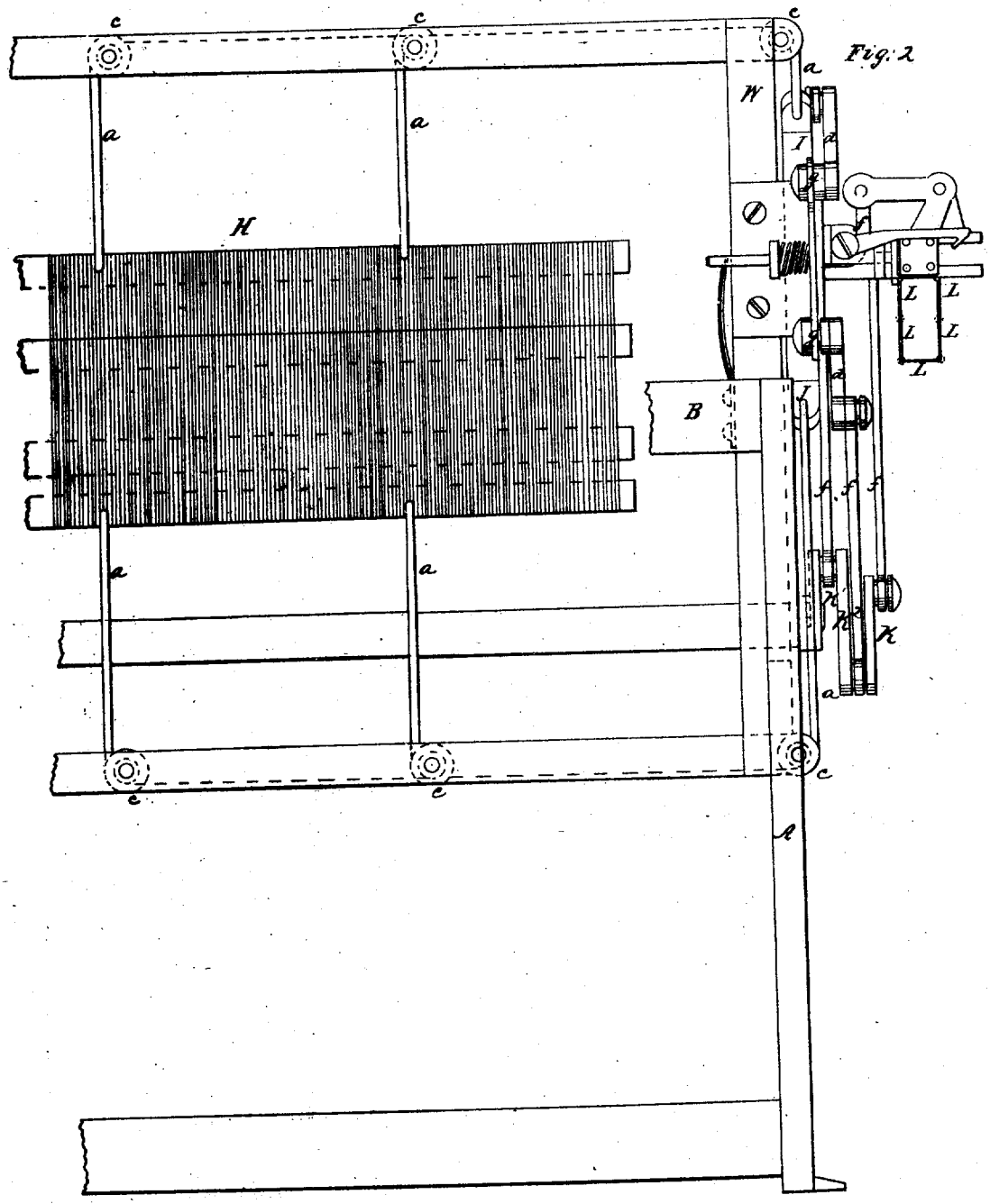
Witnesses
Edw. Harraden
George H. Rodes
Inventor
John Shinn United States Patent Office.

GEORGE CROMPTON, OF WORCESTER, MASSACHUSETTS, ASSIGNEE, BY MESNE ASSIGNMENTS, OF JOHN SHINN.

*Letters Patent No.* 32,236, *dated April* 30, 1861; *reissue No.* 3,246, *dated December* 29, 1868.

IMPROVEMENT IN LOOMS.

The Schedule referred to in these Letters Patent and making part of the same.

*To all whom it may concern:*

Be it known that I, JOHN SHINN, of Leverington, in the county of Philadelphia, and State of Pennsylvania, have invented certain new and useful Improvements in Looms; and that the following, taken in connection with the drawings, is a full, clear, and exact description thereof.

In the drawings—

Figure 1 is an end view of a loom, exhibiting my invention.

Figure 2 is a front view of the same.

Figure 3 is a detailed view, showing the jacks, and parts connected in operation therewith.

Figure 4 is a view of a single link or section of a well-known pattern-chain.

My improvements relate to a method of connecting the upper and lower edges of leaves of heddles with the jacks, the gist of the invention being that the tops and bottoms of the leaves are connected to each other by a system of cords and pulleys, and a blade or rod, to which is secured a jack, in such manner that force, applied to the jacks, may move the heddles either up or down, without being transmitted through vertical, horizontal, or bell-crank levers, as has heretofore been the practice.

And the second part of my invention relates to lifters and depressers, which act upon leaves of heddles, through the intervention of proper connections, so as to elevate and depress leaves of heddles by a positive motion, that is, to lift them up and force or shove them down; such lifters and depressers having an oscillating and sliding motion, that is to say, that one end thereof both slides and oscillates, and some point in each moves in right lines only, and this peculiar motion I call the characteristic motion of the lifters and depressers.

These elevators and depressers, having this characteristic motion, cause all the warp-threads in the shed, when open, and in that incline thereof nearest the cloth, to be in the same inclined planes, or nearly so, that is to say, one plane for the elevated and another for the depressed warp-threads, this result not being a new one, but having been heretofore attained in a jacquard loom, by a griff and neck-board arranged on top of the loom, having oscillating and sliding motions, neither of which, however, positively depressed warp-threads, but merely allowed them to descend by gravity, or the force of springs, to the lower side of the shed.

My invention also consists in a new form of jacks or vibrating attachments, controlled by a pattern-chain, and acted upon by lifters and depressers.

Parts of looms, well known, and not forming part of my invention, and therefore useless to be specially described, are either not shown and described at all, or only so far indicated as may be necessary to a clear understanding of my invention.

In the drawings—

A loom-frame is shown at A, warp-threads at *y y y*, and the cloth-making point at D.

The heddles are shown at H, and the top of each leaf is connected to the bottom thereof by cords, *a a*, passing over pulleys, *c c c*, (properly supported in the loom-frame,) and attached to blades or rods, I I, the heddles, cords, and blades forming a quadrilateral, the rod being, in fact, a rigid part of the cord, and the construction being such that, when the blades are moved either up or down, the leaves of heddles must move in the opposite direction.

Jacks, *i i*, are attached, by pivots, *m m*, to each of the blades, (by preference inserted in a slot in the blades, as shown at fig. 3.)

These jacks are of a particular form, (see fig. 3,) so that when either the upper or lower half projects, the other half is concealed, or lies even with or behind that edge of the blade nearest the pattern-chain, and so that the projecting part forms an inclined plane to move the corresponding needle backwards when the jack moves either upwards or downwards.

In fig. 3, the upper half is shown as projecting, so that the jack is in such position as will cause the blade to be depressed at the next stroke of the elevators and depressers, which act either upon the upper or lower horizontal edges of these jacks, according to their position with respect to the blades.

These jacks, like all others, have motion in two directions, one derived from the pattern-chain, and, in the present case, outwards from and inwards towards the loom, the other derived from the lifters and depressers, and, in the present case, vertical, up and down, and this latter movement they communicate to the blades and heddles.

By reference to the drawings, it will be perceived that these blades, and consequently these jacks, lie in a row, so that each and any one of them may be acted upon by the acting edge of the lifter or depresser, which is a single straight edge or long narrow surface, like that of a ruler, and also that the motions of the jacks, derived from the pattern-mechanism hereafter described, are in planes perpendicular to the planes in which the elevator and depresser move, this arrangement enabling the jacks to be packed closely, and to be controlled by a single edge of either elevator or depresser.

The jacks are, in the loom represented in the drawings, acted upon by a pattern-chain, consisting of metal cards, or sections, L, having holes in them, and buttons or small doors, either to cover or uncover the holes, so as to vary the pattern, the chain acting upon the jacks through the intervention of needles, *n*, fig.

3, sliding freely in guides, 1 2. These needles are moved towards the jacks by the chain, and away from them by the inclined form and vertical motion of the jacks.

I prefer to use a pattern-chain having two sets of motions, one, of revolution on its prism, and the other, towards and from the needles, these motions being produced by the usual contrivances, and, in the present case, derived from a crank, K, which is the outermost of three cranks mounted upon the same shaft.

The motion of the jacks, derived from the chain, does not alter the position of or impart any movement to the cords, blades, or heddles.

The lifter and depressers *d d* are rods, whose acting edges, numbered 1, 2, 3, 4, move up and down in close proximity to the blades, and are situated at one side of the loom-frame, (outside of it,) and will strike against such jacks as are placed in proper position by the chain, and, by acting upon them, positively lift up or positively force down the heddles.

These lifters and depressers have pins attached, near to one end thereof, sliding in and supported by slots, *g g*, and, near the other end, are guided by pins, *e e*, which embrace stationary rods, *q q*, attached to the loom-frame, the gist of the construction being that one end of the lifters and depressers is free to oscillate up and down, and also to have a slight longitudinal motion, while another point, in both the lifter and depresser, is forced to travel in a right line by means of guides or a guiding-apparatus.

The oscillating and sliding point is in such position, with reference to the jacks and cloth-making line, that the heddles, when lifted or depressed, locate all the warp-threads in two planes, which cross at the cloth-making line, or nearly so, and gradually incline away from each other, and this effect is, as before stated, not new, but I believe the result has never been accomplished by any apparatus having characteristic motions, as specified, and positively depressing the heddles, or by any apparatus having characteristic motions, as specified, arranged at one side of a loom, or by any apparatus having such motions in combination with a row of jacks, or any substitute or equivalent therefor moved by a pattern-mechanism in planes perpendicular to those in which the lifter and depresser move.

The elevator and depresser are actuated by cranks, $K^1$ $K^2$, one hundred and eighty degrees apart, whose pins are connected, by ordinary connecting-rods, to the elevator and depresser, the gist of the construction being that one is forced to move up while the other moves down, and *vice versa*, thus elevating or depressing such jacks as may be selected by the pattern-chain, (preparatory to either elevation or depression,) and elevating or depressing them to greater distances, in proportion as the jacks occupy positions further back from the line of deposit of the warp-thread.

The loom exhibited in the drawings, with my invention applied to it, is of that class known as an open-shed fancy-loom, and has spring-latches, *r s*, figs. 2 and 3, which take into notches, *v v*, in the blades, so as to hold the jacks, and consequently the heddles, in either elevated or depressed positions, as long as the exigencies of the pattern may require. Substantially such latches, acting in combination with heddles, to produce this effect, were, I now know, old at the time of my invention.

The combination of heddles, cords, pulleys, and blades reduces the weight of the moving parts of the loom below that of any arrangement of levers and their accessories for connecting heddles known to me, and my combination of these elements differs from that represented in the patent granted to William Townshend, March 1, A. D. 1853, in that my blades receive motion from the lifters and depressers only, and consequently move in right lines, or nearly so, whereas the blades or rods in his loom have motion in two directions, the one derived from a pattern-chain, the other from lifters and depressers, and these blades or rods in his loom consequently perform the duties both of jacks and blades, while in my loom, on the contrary, the blades are merely a rigid part of the connection, to which jacks are attached.

In his loom the motion of the blades, which is derived from the pattern-chain, alters the tension of the cording, and imparts a tremulous motion to the heddles, and both of these results are objectionable.

In my loom the blades have no such motion, and such results are avoided, the combination in my loom being such that the pattern-chain moves the jacks, and that this motion of the jacks has no effect, either on the blades, cording, or heddles.

What I claim as my invention, is—

1. The combination of the following elements, viz, heddle-leaves, cords, pulleys, blades or rods, and jacks, or pieces capable of motion in two directions, the combination being substantially as described.

2. The combination of the following elements, viz, heddle-leaves, cords, pulleys, rods or blades, jacks, and a pattern-mechanism, the combination being substantially such as specified.

3. In combination with a depresser, having an oscillating and sliding motion, and positively depressing leaves of heddles, an elevator, elevating leaves of heddles, and having also an oscillating and sliding motion, the combination being substantially such as set forth.

4. The relative arrangement of leaves of heddles within a loom-frame, as described, and elevators and depressers, having the characteristic motions specified, at one side of the loom-frame, the arrangement being substantially such as described.

5. An elevator and a depresser, both having the characteristic motions specified, in combination with jacks, the depresser, and elevator, and jacks operating as specified, so that the jacks are either positively depressed or lifted by the motion of the lifter and depresser, the combination being as described.

6. A double-throw crank, or two cranks on the same revolving shaft, in combination with a lifter and depresser having characteristic motions, as specified, by means of connecting-rods, the combination being substantially as described.

7. A depresser, having characteristic motions, as specified, in combination with a row or series of jacks, when the acting part of the depresser is an edge, or long narrow surface, and all the jacks are so arranged that they may be acted upon by that surface, the jacks having motion derived from the pattern-chain, in planes perpendicular, or nearly so, to that plane in which the depresser moves, the combination being substantially as described.

8. An elevator, having characteristic motions, as specified, in combination with a row or series of jacks, when the jacks are so arranged that their motions, derived from the pattern-chain, are in planes perpendicular, or nearly so, to that in which the elevator moves, the combination being substantially as described.

9. And lastly, jacks, with upper and lower edges, one suitable to be acted upon by an elevator, and the other by a depresser, so shaped, and pivoted upon blades, substantially as described, that their inclined projecting edges shall move the needles backwards, as specified.

JOHN SHINN.

Witnesses:

EDW. HARASTICK,

GEORGE S. RODES.